W. C. SMILEY.
CONVEYER.
APPLICATION FILED DEC. 10, 1919.
1,385,281.
Patented July 19, 1921.
2 SHEETS—SHEET 1.
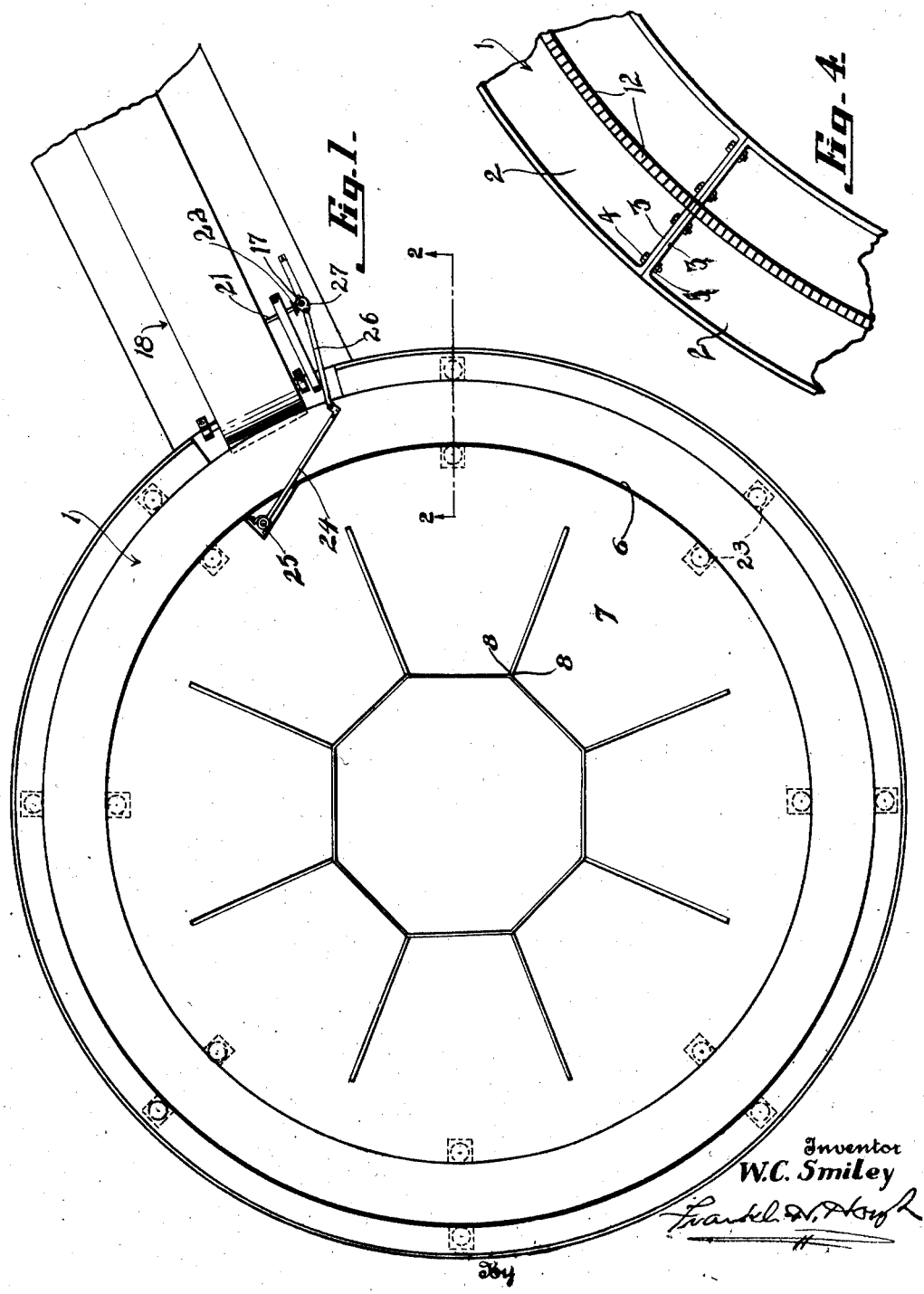

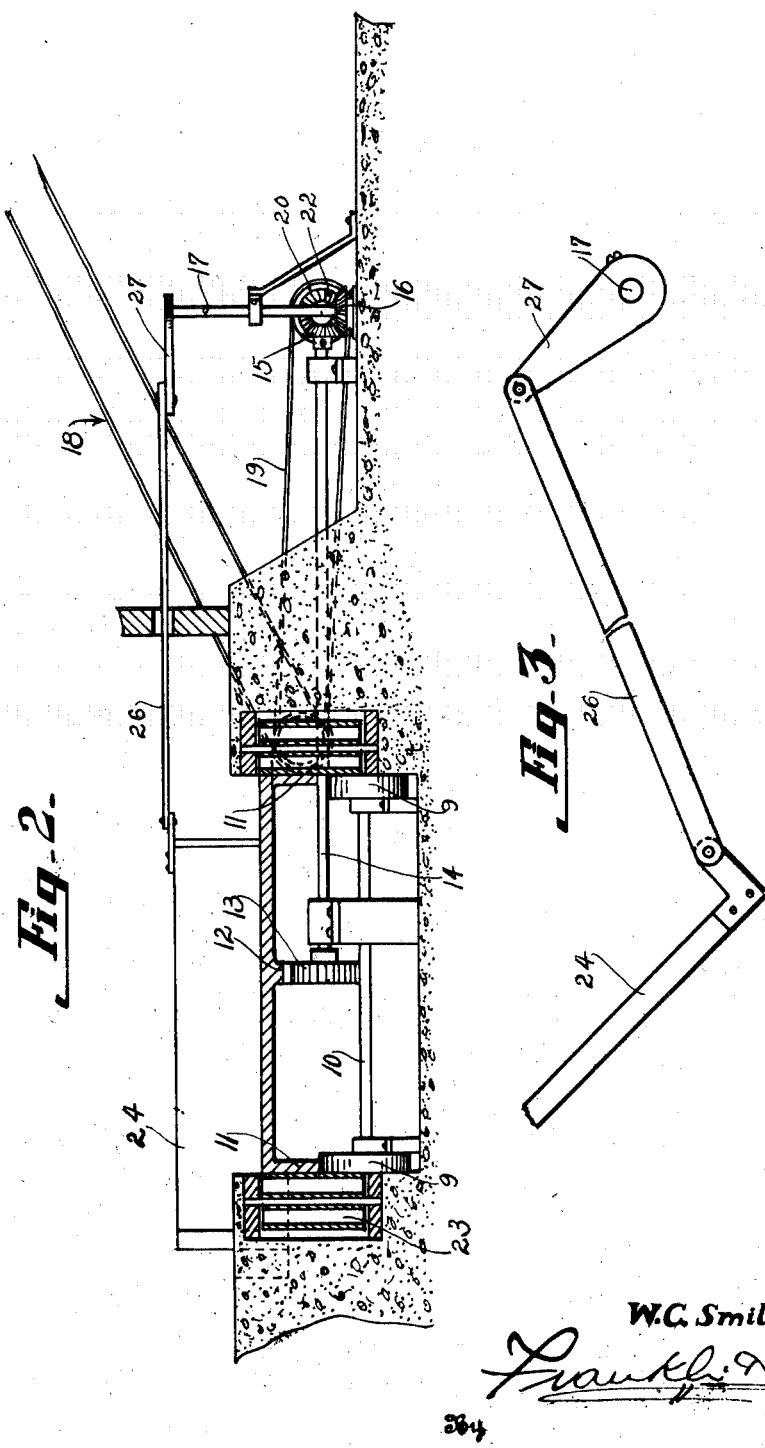

UNITED STATES PATENT OFFICE.

WILMONT C. SMILEY, OF WAMPUM, PENNSYLVANIA.

CONVEYER.

1,385,281.  Specification of Letters Patent.  Patented July 19, 1921.

Application filed December 10, 1919. Serial No. 343,807.

*To all whom it may concern:*

Be it known that I, WILMONT C. SMILEY, a citizen of the United States, residing at Wampum, in the county of Lawrence and State of Pennsylvania, have invented certain new and useful Improvements in Conveyers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in conveyers for various purposes, and in the present application I have elected to embody the features of my invention in an apparatus especially adapted for use in dairy barns.

The invention consists essentially in the provision of a rotatable carrier or conveyer with means automatically operated for removing material from the conveyer while the parts are in operation.

More specifically, the present invention consists of a rotatable conveyer positioned about a series of stalls as commonly arranged in circular dairy barns, with a movable material remover having means for automatically actuating the same in a direction opposite the movement of the conveyer.

The invention comprises various other details of construction, combination and arrangement of parts which will be hereinafter fully described, shown in the accompanying drawings and then specifically defined in the appended claims.

I illustrate my invention in the accompanying drawings which, with the numerals of reference marked thereon, form a part of this application, and in which:

Figure 1 is a top plan view of the conveyer as applied.

Fig. 2 is a sectional view taken substantially on line 2—2 of Fig. 1.

Fig. 3 is a detail top plan view of the deflector board operating mechanism, and Fig. 4 is a fragmentary bottom view of the conveyer.

Reference now being had to the details of the drawings by numerals:

1 designates the conveyer which comprises an annulus formed of cast iron or any other material, and made in two or more sections 2 fitted end to end and provided at their abutting ends with depending flanges 3, receiving securing bolts 4 upon which are screwed nuts 5. By constructing the conveyer in this manner it may be readily assembled or disassembled as conditions may require.

This conveyer operates in a circular depression or trough 6 provided in the floor 7 of the barn, this trough being positioned adjacent the back or outer ends of the stalls 8 which radiate from the central portion of the floor, as is the common practice in dairy barns of circular type, though it will be understood that the stalls can equally well be placed outside of the trough about the wall of the barn, as is sometimes preferred in large circular barns. The conveyer fits snugly in the trough and is supported upon rollers 9 mounted on shafts 10 positioned beneath the conveyer and extending radially relative thereto the rollers engaging flanges 11 depending from the lateral edges of the conveyer plate, these flanges serving to steady and guide the conveyer during operation thereof while also providing reinforcing elements which materially strengthen the conveyer as a whole.

The conveyer is provided on its under side with a concentric rack 12 with which meshes a drive gear 13 secured on a shaft 14, the inner portion of which projects beneath the conveyer. A bevel gear 15 is secured on the outer end of this shaft and meshes with a bevel gear 16 secured on a vertical shaft 17 rotatably supported adjacent the lower end of an upwardly and outwardly inclined elevator 18 of any suitable or preferred type. This elevator is driven by a belt 19 passed about a drive pulley 20 secured on a drive shaft 21 of a motor or any other suitable source of power. A bevel gear 22 is secured on the outer end of the shaft 21 and meshes with gear 16. The conveyer is held against looseness by vertically disposed guide rollers 23 mounted in pockets in floor 7, and engaging flanges 11, as shown in Fig. 2.

To insure proper removal of the material from the conveyer, I provide a deflector board 24, the inner end of which is pivoted at 25 for movement about a vertical axis. This board extends across the upper face of the conveyer at an angle and has its outer end connected by a link 26 to an arm 27 secured upon the upper end of shaft 17. During operation of the conveyer, this board is oscillated and acts to deflect the material and discharge it onto the elevator, it being understood that the floor 7 is provided with suitable depressions for this purpose, which acts to discharge the material into a spreader or other suitable receptacle.

It may be found desirable in practice to make slight changes in the details of construction and arrangement of my invention, and I intend to include all such variations as fall within the scope of the appended claims, in the application in which a preferred form only of my invention is disclosed.

What I claim to be new is:

1. The combination with stalls arranged in a circle, an annulus having its periphery contiguous to the stalls, a conveyer having its loading portion adjacent to the annulus, a deflector pivoted adjacent one margin of the annulus at an inclination to its radius and into proximity to the conveyer, means to rotate the annulus, and means to simultaneously oscillate the deflector.

2. The combination with stalls arranged in a circle, a plane annulus having its periphery contiguous to the stalls, a conveyer having its loading portion adjacent to the annulus, a deflector pivoted adjacent one margin and extending across and bearing upon the annulus at an inclination to its radius and into proximity to the conveyer, means to rotate the annulus, and means to simultaneously oscillate the deflector.

3. The combination with stalls arranged in a circle, a plane annulus having its periphery contiguous to the stalls, a conveyer having its loading portion adjacent to the annulus, a deflector pivoted adjacent one margin of and extending in scraping relation across and upon the annulus at an inclination to its radius and into proximity to the conveyer, means to rotate the annulus, and means to simultaneously oscillate the deflector.

In testimony whereof I hereunto affix my signature.

WILMONT C. SMILEY.